(12) United States Patent
Prete

(10) Patent No.: US 11,186,768 B2
(45) Date of Patent: Nov. 30, 2021

(54) USE OF 4-BORA-3A,4A-DIAZA-S-INDACENES FOR SECURITY PURPOSES

(71) Applicant: CRIME SCIENCE TECHNOLOGY, Loos (FR)

(72) Inventor: Cosimo Prete, Villeneuve D'Ascq (FR)

(73) Assignee: CRIME SCIENCE TECHNOLOGY, Loos (FR)

( * ) Notice: Subject to any disclaimer, the term of this patent is extended or adjusted under 35 U.S.C. 154(b) by 332 days.

(21) Appl. No.: 16/068,579

(22) PCT Filed: Jan. 9, 2017

(86) PCT No.: PCT/FR2017/050045
§ 371 (c)(1),
(2) Date: Jul. 6, 2018

(87) PCT Pub. No.: WO2017/118830
PCT Pub. Date: Jul. 13, 2017

(65) Prior Publication Data
US 2019/0016953 A1 Jan. 17, 2019

(30) Foreign Application Priority Data

Jan. 8, 2016 (FR) .................................... 16 50164

(51) Int. Cl.
*B42D 25/387* (2014.01)
*C09K 11/06* (2006.01)
(Continued)

(52) U.S. Cl.
CPC ............ *C09K 11/06* (2013.01); *B42D 25/387* (2014.10); *C08K 5/0091* (2013.01); *C09B 57/00* (2013.01);
(Continued)

(58) Field of Classification Search
None
See application file for complete search history.

(56) References Cited

U.S. PATENT DOCUMENTS 5,187,288 A * 2/1993 Kang .................... C07F 5/022
548/110
5,326,692 A 7/1994 Brinkley et al.
(Continued)

FOREIGN PATENT DOCUMENTS

CA 2 921 214 A1 2/2015
CA 2921214 A1 * 2/2015 ............. C08K 3/013
(Continued)

OTHER PUBLICATIONS

Burghart et al. "3,5-Diaryl-4,4-difluoro-4-bora-3a,4a,diaza-s-indacene (BODIPY) Dyes: Synthesis, Spectroscopic, Electrochemical, and Structural Properties," J. Org. Chem., 1999, pp. 7813-7819, Vo. 64 (Year: 1999).*

(Continued)

*Primary Examiner* — Cachet I Proctor
(74) *Attorney, Agent, or Firm* — Nixon & Vanderhye

(57) ABSTRACT

The invention relates to the use of one or more compounds of the 4-bora-3a,4a-diaza-s-indacene family for the preparation of a security element for a product, in particular a document, said security element comprising a polymer and said compound(s) being incorporated in said polymer, and to a method for ensuring the security of a product, in particular that of a document.

16 Claims, 2 Drawing Sheets

(51) Int. Cl.
G09F 3/00 (2006.01)
C08K 5/00 (2006.01)
C09B 57/00 (2006.01)
C09K 11/02 (2006.01)

(52) U.S. Cl.
CPC ............ *C09K 11/02* (2013.01); *G09F 3/0291* (2013.01); *C09K 2211/1022* (2013.01); *C09K 2211/1055* (2013.01)

(56) References Cited

U.S. PATENT DOCUMENTS

| | | | |
|---|---|---|---|
| 5,928,456 A | 7/1999 | Souparis | |
| 10,800,970 B2 | 10/2020 | Sakaino et al. | |
| 2003/0047610 A1* | 3/2003 | Selinfreund | G07D 7/1205 235/454 |
| 2003/0112423 A1* | 6/2003 | Vig | B42D 25/378 356/71 |
| 2004/0000787 A1* | 1/2004 | Vig | G07D 7/12 283/113 |
| 2004/0029137 A1* | 2/2004 | De Lamberterie | B41M 3/144 435/6.11 |
| 2007/0048761 A1* | 3/2007 | Reep | C12Q 1/68 435/6.11 |
| 2009/0042191 A1* | 2/2009 | Hayward | C12Q 1/6816 435/6.11 |
| 2011/0069307 A1* | 3/2011 | Forshee | C10L 1/003 356/300 |
| 2011/0263037 A1* | 10/2011 | Herz | C08K 3/36 436/163 |
| 2012/0038140 A1 | 2/2012 | Dhome et al. | |

FOREIGN PATENT DOCUMENTS

| | | | |
|---|---|---|---|
| CN | 107922835 A | 4/2018 | |
| EP | 0 708 935 B1 | 6/2005 | |
| WO | 93/23492 A1 | 11/1993 | |
| WO | 95/31756 A1 | 11/1995 | |
| WO | 2010/086522 A1 | 8/2010 | |
| WO | WO-2012080467 A1 * | 6/2012 | ........... B42D 25/425 |

OTHER PUBLICATIONS

Treibs et al., "Difluorboryl-Komplexe von Di- und Tripyrrylmethenen", Liebigs Ann. Chem., 1968, pp. 208-223, vol. 718.

Schmidt et al., "Synthesis and Optical Properties of 2-(Benzo[b]thiophene-3-yl)pyrroles and a New BODIPY Fluorophore (BODIPY=4,4-Difluoro-4-bora-3a,4a-diaza-si-ndacene)", Chem. Eur J., 2009, pp. 5823-5830, vol. 15.

Vu et al., "New Hindered BODIPY Derivatives: Solution and Amorphous State Fluorescence Properties", J. Phys. Chem. C, 2009, p. 11844-11855, vol. 113.

Schmidt et al., "A General Synthetic Strategy for the Design of New BODIPY Fluorophores Based on Pyrroles with Polycondensed Aromatic and Metallocene Substituents", Chem. Eur. J., 2011, pp. 3069-3073, 17.

Vu et al., "Understanding the Spectroscopic Properties and Aggregation Process of a New Emitting Boron Dipyrromethene (BODIPY)", J. Phys. Chem. C, 2013, pp. 5373-5385, vol. 117.

Loudet et al., "BODIPY Dyes and Their Derivatives: Syntheses and Spectroscopic Properties", Chem. Rev., 2007, pp. 4891-4932, vol. 107.

Chen et al., "4,4-Difluoro-4-Bora-3A,4A-Diaza-S-Indacene (BODIPY) Dyes Modified for Extended Conjugation and Restricted Bond Rotations", Journal of Organic Chemistry, 2000, pp. 2900-2906, vol. 65.

Tatsuya et al., "An Optically and Thermally Switchable Electronic Structure Based on an Anthracene-BODIPY Conjugate", Chemistry—A European Journal, 2015, pp. 4966-4974, vol. 21, No. 13.

Hai-Tao et al., "Multicolor Emissions by the Synergism of Intra/Intermolecular Slipped π-π Stackings of Tetraphenylethylene-DiBODIPY Conjugate", Chemistry of Materials, 2015, pp. 7812-7819, vol. 27, No. 22.

Burgess et al., "New Chemistry of BODIPY Dyes, and BODIPY Dye Cassettes Featuring Through-Bond Energy Transfer", Advances in Nucleic Acid and Protein Analyses, Manipulation, and Sequencing, 2000, Proceedings vol. 3926, https://doi.org/10.1117/12.380500.

Burghart et al., "3,5-Diaryl-4,4-difluoro-4-bora-3a,4a-diaza-s-indacene (BODIPY) Dyes: Synthesis, Spectroscopic, Electrochemical, and Structural Properties", J. Org. Chem., 1999, pp. 7813-7819, vol. 64.

Chen et al., "Synthesis and spectroscopic properties of 2-ketopyrrole-BF2 complexes: a new class of fluorescent dye". Tetrahedron Letters, 2000, pp. 2303-2307, vol. 41.

International Search Report, dated Jun. 6, 2017, from corresponding PCT application No. PCT/FR2017/050045.

Office Action issued in Chinese Patent Application No. 2017800123643 dated Aug. 2, 2020 with English translation provided.

* cited by examiner

USE OF 4-BORA-3A,4A-DIAZA-S-INDACENES FOR SECURITY PURPOSES

BACKGROUND OF THE INVENTION

Field of the Invention

This invention relates to the field of securing and authenticating products, in particular documents, comprising polymers. It relates more particularly to securing and authenticating identity, fiduciary or administrative documents.

Description of Related Art

Today, counterfeiting and forgery are increasing substantially in many high value-added sectors such as luxury products, automobile and aeronautical parts or packaging, in particular drugs such as blisters. With the development of identity theft and the instauration in particular driving licences with points in some countries, identity and administrative documents are increasingly the target of falsification. Securing and the authenticity of this type of products and of documents are therefore essential and entail security issues nationally as well as internationally.

It is as such necessary to continuously provide new means that make it possible to effectively counter falsification, in particular the altering of an original document, or counterfeiting (forgery).

In the rest of the description, the term document refers to a set formed by a support and information. The support can be of different natures, have different forms and can include a polymer or a mixture of polymers. This support can for example be entirely or partially formed from a polymer material.

By way of example of a document mention shall be made in particular of identity documents such as passports, identity cards, driving licences or health cards, but also fiduciary documents such as bank notes and cheques or administrative documents such as for example registration certificates.

The documents can therefore have the form of paper, booklets or the form of a card and the information can be printed and/or etched on the surface thereof when entailing paper or a card or on sheets when entailing a booklet.

Due to the substantial value associated with the information contained, documents must be made secure.

In the field of securing documents, various companies provide visual authentication solutions, for example using holograms or laser etching, which can make it possible to insert information onto the body of the card made of polycarbonate, such as identity cards, health cards or driving licences. Application EP0708935 as such describes a holographic protective layer set. This set is comprised of a support film that has at least one layer formed by a protective varnish, a reflective or transparent layer carrying the diffracting microstructure, and finally an adhesive layer. Once the set is transferred onto a document the securing of the latter is obtained.

Afterwards, this system was improved in application WO2010/086522 via the adding of perforations in order to make it more difficult to separate the various layers. It nevertheless remains that the set is comprised of a multitude of parts that must be assembled and now perforated, which represents technical, time and cost constraints.

With the development of informatics, the security of documents has also been reinforced via the incorporation of electronic elements, such as chips, as such making falsification more difficult.

Currently, documents are secured by securing elements that can be ranked according to three levels of security based on the means used for detection. As such, level 1 securing elements are elements that can be detected by at least one of the five senses or by the intermediary of a contrasted background. In this level there are in particular guilloches, optically variable devices such as rainbow printing, holograms, optically variable inks, markers, changeable laser images or multiple laser images.

Level 2 securing elements are elements that can be detected using simple equipment such as an Ultra-Violet lamp, a convex lens or a flash light of a mobile telephone. This level has detectable elements such as micro-prints and fluorescent inks, as well as fluorescent fibres or plates.

Finally, level 3 securing elements are elements that can be detected using sophisticated equipment such as for example a spectrofluorometer or an electron microscope. In this category are in particular nano-etched pigments and biometric chips as well as fluorescent markers that cannot be detected by the unaided eye (taggants).

Generally, a document incorporates several securing elements of different levels.

Although the existing securing solutions are interesting, they are sometimes difficult to implement and/or to control. There is therefore a real need for new means of securing that are simple to implement, stable and that then allow for a fast control of the authenticity of products or of documents, while still providing a high level of security. These means must not be exclusive of one another.

DESCRIPTION OF THE CLAIMED SUBJECT MATTER

The inventors have as such succeeded in developing a means of securing that makes it possible to control the authenticity of products comprising polymers such as documents, in particular identity, fiduciary or administrative documents, but also such as drug packaging (in particular blisters), luxury products, cosmetic products, automobile and aeronautical parts or wear parts in industry such as for example seals.

Thanks to the means of securing developed, controlling the authenticity can be carried out over the three levels of security such as defined hereinabove.

Indeed, thanks to the use of one or more compounds of the 4-bora-3a,4a-diaza-s-indacene family incorporated in a polymer, and particularly in the polymer matrix that constitutes the document or product in question, a securing element that can be detected on all of the levels is obtained.

This use is particularly advantageous as the inventors have found that this family of fluorescent compounds could be incorporated into polymer matrices without altering the performance of the polymer, or those of the 4-bora-3a,4a-diaza-s-indacene compound or compounds incorporated.

As such, the invention has for object the use of one or several compounds of the 4-bora-3a,4a-diaza-s-indacene family for the preparation of a securing element for a product, in particular a document, said securing element comprising a polymer and with the 4-bora-3a,4a-diaza-s-indacene compound or compounds being incorporated into said polymer.

For the rest of the description use will be made indifferently of the terms "4-bora-3a,4a-diaza-s-indacene compound(s)" and "fluorescent dye(s)".

A product, in particular a document, secured according to this invention will therefore include a polymer in which one or several fluorescent dyes are incorporated. These secured documents can be authenticated thanks to the properties and to the effects conferred by the fluorescent dyes.

The polymer incorporating one or several fluorescent dyes thus forms a securing element that can also be implemented at the moment the product is manufactured, in particular for the document in question, as well as be applied or integrated a posteriori into the latter. As such, in the framework of securing a document, the securing element can be present over all or a portion of the document. These points will be developed further on in the description.

In any case, the products and in particular the documents obtained, will be secured through the use of one or several fluorescent dyes incorporated in a polymer. Securing makes it possible to provide the products with several effects and in particular the following effects:

Activation/deactivation effect (on/off): This effect corresponds to the viewing of a change in colour following a stimulation of the fluorescence of the fluorescent dyes in particular by a light source of the LED or UV type. This provides level 2 security.

Waveguide effect: The presence of grooves in the layer or layer set, generates a discontinuity in the refractive index that stimulates the fluorescence of the secured layer. As such, the colour observed on the groove is different from that observed on the rest of the layer or layer set. This provides level 1 security.

The 4-bora-3a,4a-diaza-s-indacene compounds are fluorescent dyes of which the first synthesis was published in 1968 (A. Treibs et al, Justus Liebigs Ann. Chem. 1968, 718, 208). Since then, several other syntheses have been published (for example: Chem. Eur. J., 2009, 15, 5823; J. Phys. Chem. C, 2009, 113, 11844; Chem. Eur. J., 2011, 17,3069; J. Phys. Chem. C, 20B, 117, 5373) and many 4-bora-3a,4a-diaza-s-indacene compounds are commercially available, for example from ThermoFisher Scientific (Waltham, Mass. USA).

They have remarkable absorption and emission properties and have in particular fluorescent excitation and emission bands that are relatively narrow with high quantum yields $\phi$ between 0.5 and 1, which make them highly fluorescent. In addition, these compounds have good photostability as well as substantial thermal stability. Indeed, the fluorescent dyes according to the invention are generally stable up to 300° C. Thanks to this substantial thermal stability, these fluorescent dyes can easily be incorporated into polymer matrices in molten state and against all expectations, the performance in terms of the absorption and emission of fluorescence are not altered by the incorporation into a polymer matrix.

The use of one or several 4-bora-3a,4a-diaza-s-indacene compounds is also remarkable in that the products, in particular documents, secured in accordance with the invention can be authenticated thanks to the unique combination of the colour absorbed and of the specific fluorescence that the fluorescent dyes confer to the polymer. As such, only an authentic product will have both good fluorescence absorption and emission properties.

The products, in particular documents, comprising a polymer which are secured according to the invention by the incorporation of one or several 4-bora-3a,4a-diaza-s-indacene compounds in the polymer can therefore be authenticated over the three levels of security described hereinabove thanks to the sole presence of the 4-bora-3a,4a-diaza-s-indacene compound(s). As far as the Applicant knows, this is the first time that a single securing element allows for such multi-level securing.

Indeed, the 4-bora-3a,4a-diaza-s-indacene compounds all have an absorption band in the visible spectrum and the colour perceived by the unaided eye will correspond to the complementary colour of the absorbed colour. For example an absorbing compound around 500-520 nm, which corresponds to a blue/green colour, will appear to the unaided eye as orange/red tones. This property as such makes it possible to obtain level 1 securing elements.

With regards to the fluorescence properties, the compounds of the 4-bora-3a,4a-diaza-s-indacene family according to the invention all have excitation bands in the Ultra-Violet (U.V.) range and emission bands in the visible range. They can therefore be excited by the intermediary in particular of a U.V. lamp emitting between 100 nm and 400 nm and the fluorescence can be detected by the unaided eye, which makes it possible to obtain level 2 securing elements.

Finally, the emission wavelength can be determined using a spectrofluorometer or single-network low-resolution fluorometer (detection by photodiode or photomultiplier tube), which provides the securing elements according to this invention with level 3 security.

As such, the products and in particular the documents secured according to this invention will be, thanks to the association of the absorption and fluorescence properties, able to be detected on the 3 levels.

Authentication in terms of this invention is understood as the verification of the authenticity of a product, in particular a document through the detection of securing elements or means of securing that are incorporated therein. This detection of the presence or of the absence of colouration or of fluorescence makes it possible to authenticate or not the product, in particular a document in question.

A product, in particular a document, will therefore be authentic when it has not been reproduced and when it contains the securing element or elements, in opposition to a non-authentic item which will be qualified as false, and which will not contain said securing elements resulting as such in a detection fault.

The term "incorporated" means the fact that one or several 4-bora-3a,4a-diaza-s-indacene compounds are intimately integrated in the polymer in such a way as to form a homogenous mixture, that does not have any dispersion. Integrating the compound or compounds into the polymer can be carried out in various ways.

As an example, the integrating is carried out hot. In this case the polymer is heated to its melting temperature, then the 4-bora-3a,4a-diaza-s-indacene compound or compounds are added to the molten mass before the whole is mixed until homogeneity is obtained.

Still as an example, the fluorescent dye is integrated in the form of a powder into the polymer. In this case, the polymer can have the form of a light-curing resin and in order to facilitate integration, a polar solvent can be added, such as for example isopropanol. The whole is then mixed in such a way as to obtain a homogeneous mixture that does not have any dispersion, said mixture will have a particular application in certain 3D printing techniques and in particular for the manufacture of holograms.

The incorporating can be done in all types of polymer such as for example polycarbonate, polyester, polystyrene, polyethylene, polypropylene, polyethylene terephthalate (PET), polyacrylate, polymethacrylate, poly(vinyl chloride), polyamides, polyaramides, ethylene vinyl acetate (EVA), polyurethane, thermoplastic polyurethane (TPU), cyanoacrilate, rosin resins, pine resins, light-curing resins or mixtures thereof. Preferably the incorporating can be done in a polymer chosen from polycarbonate, polyester, polypropylene, thermoplastic polyurethane and light-curing resins, preferably from polycarbonate, polyester, polypropylene and mixtures thereof.

Advantageously a polymer will be used that does not contain any anti-U.V. additive in order to allow for an optimum maintaining of the fluorescence properties. It is also advantageous to use a polymer that is transparent after having been formed.

The quantity of fluorescent dye to be incorporated is that required for the detection of the absorbance and fluorescence properties. The fluorescent dyes according to the invention have the advantage of allowing for a detection of the properties even when they are incorporated into the polymer in very small quantities.

Indeed, quantities of fluorescent dyes ranging from 0.01% to 5% by weight with respect to the total weight of the polymer are sufficient for the detection, preferably quantities ranging from 0.01% to 2% by weight with respect to the total weight of the polymer and even more preferably, quantities ranging from 0.01% to 0.05% by weight with respect to the total weight of the polymer.

The quantities of fluorescent dye(s) will be adapted by those skilled in the art according to the forming of the polymer and the visual effect sought. For example, the more the visual effect of transparency is sought, the lower the quantity in fluorescent dye will have to be, as with the thickness of the form obtained.

As mentioned hereinabove, the polymer incorporating one or several fluorescent compounds thus forms a securing element which can be used at the time of manufacture of the product, in particular the document in question, as well as be applied or integrated a posteriori into the latter. For the securing of products and in particular documents, the securing element can be present over all or a portion of the document on the surface as well as in the thickness itself of the document. For example, it can be present over an entire surface or only on the periphery and can even form the support of the document as such.

According to the use sought, the securing element can therefore be formed by methods known to those skilled in the art.

Indeed, in an embodiment, the securing element has the form of a layer or of a set of layers prepared using techniques known to those skilled in the art such as for example laminating, extrusion, calendering, calendering extrusion, bulking extrusion with or without bi-drawing or varnishing and/or coating. These techniques will be chosen according to the polymer used and the final thickness of the layer or of the set of layers to be obtained. As an example, if the polymer is a polycarbonate or a thermoplastic polyurethane, the principle of calendering extrusion will be preferred. As a further example, if the polymer is polypropylene, the principle of bulking extrusion is preferred, in particular the principle of bulking extrusion with bi-drawing. A set of layers in terms of this invention can for example be obtained by laminating two or more layers of polymer incorporating one or several fluorescent dyes.

Such a layer or set of layers has an advantageous application in the securing of documents. Preferably, the layer or set of layers obtained as such is transparent.

Using a layer or a set of transparent layers according to this invention is particularly advantageous because, in addition to the effects described hereinabove, the layer or set of layers has the following effects:

Switch-colour effect: This effect corresponds to a change in the colour during the superposition of the layer or of the set of layers on a contrasted background (of the dark background type, in particular black, or a light background, in particular white. The complementary colour of the colour absorbed on a light background and the fluorescence colour on a dark background are as such observed. This provides level 1 security.

Side-effect: This effect corresponds to the observation of a complementary colour of the absorbed colour that is different on the edges of the layer or set of layers, from that observed on the surfaces. This provides level 1 security.

Tilt effect/rocker effect: This effect corresponds to a change in colour of a layer or of the superposition of a set of layers on a reflective surface (a metallised surface for example), said change in colour being according to the angle of observation and of the more or less reflective capacity of the reflective background (partial reflection to total reflection). As such, a change in the pure colour of the colour perceived by the unaided eye of the substrate towards its fluorescence emission is observed. This provides level 1 security.

Shadow effect: This effect corresponds, when the fluorescence is stimulated by a lamp of the LED or UV type and as observed on a light background, in particular white, to the viewing of both the fluorescence colour on the layer and of the projection of the complementary colour of the absorbed colour on the light background. This provides level 2 security.

Advantageously, the layer has in particular a thickness ranging from 0.050 mm to 0.800 mm, preferably a thickness ranging from 0.200 mm to 0.600 mm, such as for example a thickness of about 0.400 mm. When the layer has a thickness less than 0.100 mm, it is also called a film and fill have a particular application in the case of flat products, in particular documents and more particularly identity, fiduciary or administrative documents and can be applied onto at least one portion of one of the surfaces of the product.

The thickness of the layer or of the film is according to various parameters such as the nature of the polymer used for the incorporation of the compound of the 4-bora-3a,4a-diaza-s-indacene family. For example, when the polymer used for the incorporation is polypropylene, the layer or the film obtained can advantageously have a thickness ranging from 15 µm to 100 µm. As a further example, when the polymer used for the incorporation is polycarbonate, the layer or the film obtained can advantageously have a thickness ranging from 100 µm to 800 µm.

According to a particular embodiment, the layer is a film and preferably has a thickness between 1 and 30 µm, such as for example about 10 µm. The film can be obtained according to the methods known to those skilled in the art and preferably it is a bi-oriented film.

According to this embodiment, the bi-oriented films can be single-layer bi-oriented films or multi-layer bi-oriented films obtained for example by laminating several layers of which at least one of them contains a fluorescent compound such as described hereinabove. The bi-oriented films can be obtained by flat film extrusion, called cast extrusion, or by annular extrusion (bulking extrusion). The polymer used for the obtaining of bi-oriented films can be a polymer such as described hereinabove, and preferably the polymer is polypropylene. As such a film made of bi-oriented polypropylene is obtained.

In a particular embodiment, the layer forming will make it possible to manufacture cards via techniques known to those skilled in the art. As an example, mention shall be made of cards, professional cards, bank cards, or any other type of card made of polymer. In this case, the securing element forms the support of the document as such.

The cards can for example be obtained by laminating of several layers of polymer of which at least one of them incorporates at least one fluorescent dye according to this invention.

In a particular embodiment, the securing element is a film, i.e. a layer having a thickness less than 0.100 mm, in particular ranging from 0.050 mm to 0.100 mm, that is used to laminate the two surfaces of a document, in particular an identity document. In another embodiment, such a film is applied to only one of the two surfaces of a document, in particular an identity document. In yet another embodiment, such a film is applied to only a portion of one of the two surfaces of a document, in particular an identity document. In yet another embodiment, such a film is applied to only a portion of each one of the two surfaces of a document, in particular an identity document.

The 4-bora-3a,4a-diaza-s-indacene compound(s) implemented in this invention can be chosen from those of the formula I hereinbelow:

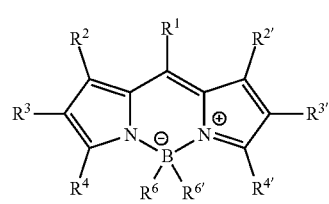
(I)

wherein, $R^1$ is C1 to C6 alkyl, C5 to C6 cycloalkyl, C5 to C6 heteroalkyl, phenyl, said phenyl group being optionally substituted by one or several groups chosen from C1 to C2 alkyl, hydroxy, $R^5COO^-$ and halogen;

$R^2$ and $R^{2'}$ are independently chosen from hydrogen and C1 to C2 alkyl;

$R^3$ and $R^{3'}$ are independently chosen from hydrogen, aryl, heteroaryl, cycloalkyl, alkyl, alkenyl, alkynyl, said aryl, heteroaryl, cycloalkyl, alkyl, alkenyl and alkynyl being optionally substituted by one or several groups chosen from C1 to C4 alkyl, aryl, hydroxy and ferrocene, said aryl group being optionally substituted by one or several groups chosen from aryl, C1 to C2 alkyl, halogen, hydroxy, dimethylamino, nitro, said aryl being optionally substituted by a C1 to C2 alkyl group;

$R^4$ and $R^{4'}$ are independently chosen from aryl, heteroaryl, cycloalkyl, alkyl, alkenyl, said aryl, heteroaryl, cycloalkyl, alkyl and alkenyl being optionally substituted by one or several groups chosen from C1 to C3 alkyl, aryl, hydroxy and ferrocene, said aryl group being optionally substituted by one or several groups chosen from aryl, C1 to C2 alkyl, halogen, hydroxy, dimethylamino, nitro, said aryl being optionally substituted by a C1 to C2 alkyl group;

$R^5$ is C1 to C4 alkyl or C2 to C4 alkenyl.

$R^6$ and $R^{6'}$ are independently chosen from halogens, C1 to C4 alkyl, C2 to C4 alkenyl or aryl, said aryl being optionally substituted by one or several groups chosen from C1 to C2 alkyl, hydroxy, R5COO— and halogen.

Preferred compounds of formula I are those wherein one or several of $R^1$, $R^2$, $R^{2'}$, $R^3$, $R^{3'}$, $R^4$, R4', R5, R6 and R6' are defined as follows:

$R^1$ is a phenyl substituted by one or several groups chosen from methyl, fluorine, hydroxy, acetyl and methacrylate, preferably from methyl, fluorine, hydroxy and acetyl and more preferably from methyl or fluoro;

$R^2$ and $R^{2'}$ are independently chosen from hydrogen and a methyl;

$R^3$ and $R^{3'}$ are independently chosen from hydrogen, C1 to C3 alkyl, vinyl, aryl, heteroaryl, adamanthyl, said vinyl and aryl being optionally substituted by one or several groups chosen from phenyl, C1 to C2 alkyl, said phenyl being optionally substituted by one or several groups chosen from C1 to C2 alkyl, hydroxy, bromine, nitro, dimethylamine, preferably hydrogen, methyl, ethyl, n-propyl, vinyl, aryl, heteroaryl, adamanthyl, said vinyl and aryl being optionally substituted by one or several groups chosen from phenyl, C1 to C2 alkyl, said phenyl being optionally substituted by one or several groups chosen from C1 to C2 alkyl, hydroxy, bromine, nitro, dimethylamine, more preferably, $R_3$ and $R_{3'}$ are independently chosen from ethyl, n-propyl, methyl, vinyl, phenyl, phenantryl, naphthyl, pyrenyl, thiophenyl, benzofuranyl, said vinyl, aryl and naphthyl being optionally substituted by one or several methyl, hydroxy, bromine, nitro and dimethylamino;

$R^4$ and $R^{4'}$ are independently chosen from methyl, vinyl, aryl, heteroaryl, adamanthyl, said vinyl and aryl being optionally substituted by one or several groups chosen from phenyl, C1 to C2 alkyl, said phenyl being optionally substituted by one or several groups chosen from C1 to C2 alkyl, hydroxy, bromo, nitro, dimethylamine, preferably $R^4$ and $R^{4'}$ are independently chosen from methyl, vinyl, phenyl, phenantryl, naphthyl, pyrenyl, thiophenyl, benzofuranyl, said vinyl, aryl and naphthyl being optionally substituted by one or several methyl, hydroxy, bromo, nitro and dimethylamino;

$R^5$ is methyl or ethenyl.

$R^6$ and $R^{6'}$ are independently chosen from fluorine, C1 to C4 alkyl, C2 to C4 alkenyl or aryl, said aryl being optionally substituted by one or several groups chosen from C1 to C2 alkyl, hydroxy, R5COO— and halogen, preferably R6 and R6' are fluoro.

According to an embodiment, the 4-bora-3a,4a-diaza-s-indacene compound(s) implemented in this invention can be chosen from those of formula II hereinbelow:

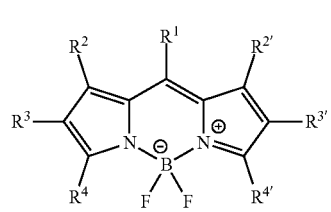
(II)

wherein, $R^1$ is C1 to C6 alkyl, C5 to C6 cycloalkyl, C5 to C6 heteroalkyl, phenyl, said phenyl group being optionally substituted by one or several groups chosen from C1 to C2 alkyl, hydroxy, $R^5COO^-$ and halogen;

$R^2$ and $R^{2'}$ are independently chosen from hydrogen and C1 to C2 alkyl;

$R^3$ and $R^{3'}$ are independently chosen from hydrogen and C1 to C3 alkyl;

$R^4$ and $R^{4'}$ are independently chosen from aryl, heteroaryl, cycloalkyl, alkyl, alkenyl, said aryl, heteroaryl, cycloalkyl, alkyl and alkenyl being optionally substituted by one or several groups chosen from C1 to C3 alkyl, aryl, hydroxy and ferrocene, said aryl group being optionally substituted by one or several groups chosen from aryl, C1 to C2 alkyl, halogen, hydroxy, dimethylamino, nitro, said aryl being optionally substituted by a C1 to C2 alkyl group;

$R^5$ is C1 to C4 alkyl or C2 to C4 alkenyl.

Preferred compounds of formula I of this embodiment are those wherein one or several of $R^1$, $R^2$, $R^{2'}$, $R^3$, $R^{3'}$, $R^4$, $R^{4'}$ and $R^5$ are defined as follows:

$R^1$ is a phenyl substituted by one or several groups chosen from methyl, fluoro, hydroxy, acetyl and methacrylate, preferably from methyl, fluoro, hydroxy and acetyl and more preferably from methyl or fluoro;

$R^2$ and $R^{2'}$ are independently chosen from hydrogen and a methyl;

$R^3$ and $R^{3'}$ are independently chosen from hydrogen, methyl, ethyl, n-propyl and preferably ethyl;

$R^4$ and $R^{4'}$ are independently chosen from methyl, vinyl, aryl, heteroaryl, adamanthyl, said vinyl and aryl being optionally substituted by one or several groups chosen from phenyl, C1 to C2 alkyl, said phenyl being optionally substituted by one or several groups chosen from C1 to C2 alkyl, hydroxy, bromine, nitro, dimethylamine, preferably $R^4$ and $R^{4'}$ are independently chosen from methyl, vinyl, phenyl, phenanthracenyl, naphthalenyl, pyrenyl, thiphenyl, benzofuranyl, said vinyl, aryl and naphthalenyl being optionally substituted by one or several methyl, hydroxy, bromine, nitro and dimethylamino;

$R^5$ is methyl or ethenyl.

Particular preferred compounds of formula I are those of table 1 hereinafter:

TABLE 1

| N° | Fluorescent dye |
|---|---|
| 1 | |
| 2 | |
| 3 | |
| 4 | |
| 5 | |

TABLE 1-continued

| N° | Fluorescent dye |
|---|---|
| 6 | (structure: BODIPY with pentafluorophenyl meso substituent, ethyl and methyl pyrrole substituents) |
| 7 | (structure: BODIPY with mesityl meso substituent, 2,4-dimethylphenyl α-substituents; R = Me, Et, n-Pr) |
| 8 | (structure: BODIPY with 4-acetoxyphenyl meso substituent, ethyl β-substituents, naphthalen-2-yl α-substituents) |
| 9 | (structure: BODIPY with 4-acetoxyphenyl meso substituent, ethyl β-substituents, 8-methylnaphthalen-1-yl α-substituents) |
| 10 | (structure: BODIPY with mesityl meso substituent, n-propyl β-substituents, pyren-1-yl α-substituents) |
| 11 | (structure: BODIPY with mesityl meso substituent, ethyl β-substituents, 4'-bromobiphenyl-4-yl α-substituents) |

TABLE 1-continued

| N° | Fluorescent dye |
|---|---|
| 12 | (structure) |
| 13 | (structure) R = n-Pr |
| 14 | (structure) R = Et |
| 15 | (structure) R = Me |
| 16 | (structure) |
| 17 | (structure) |

TABLE 1-continued
| N° | Fluorescent dye |
|---|---|
| 18 | 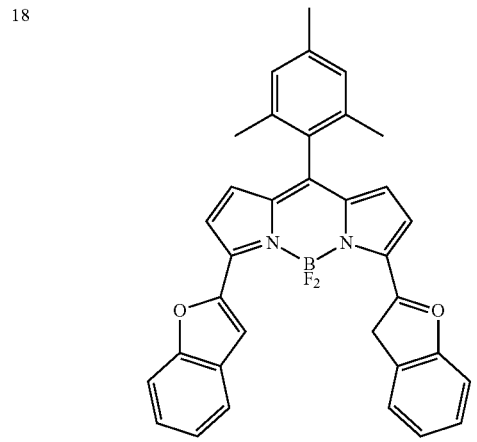 |
| 19 | 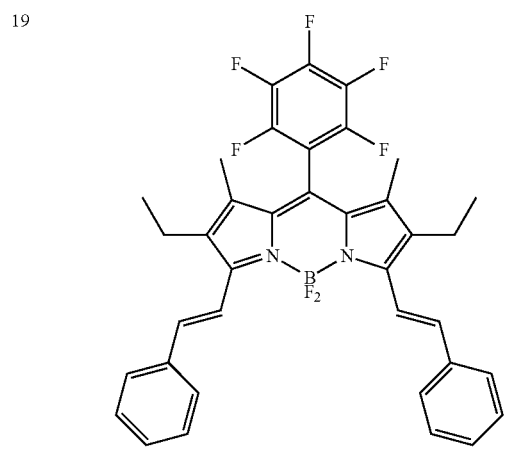 |
| 20 | 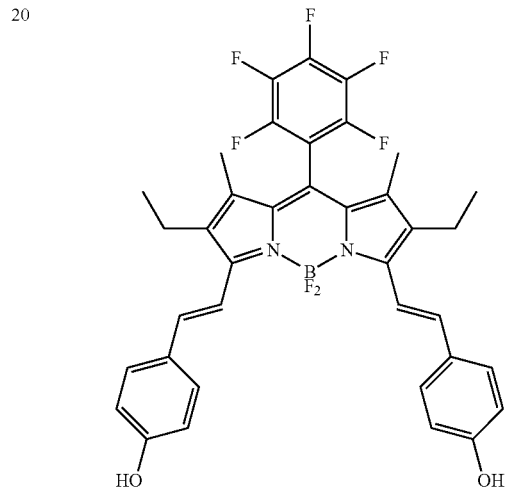 |
| 21 | 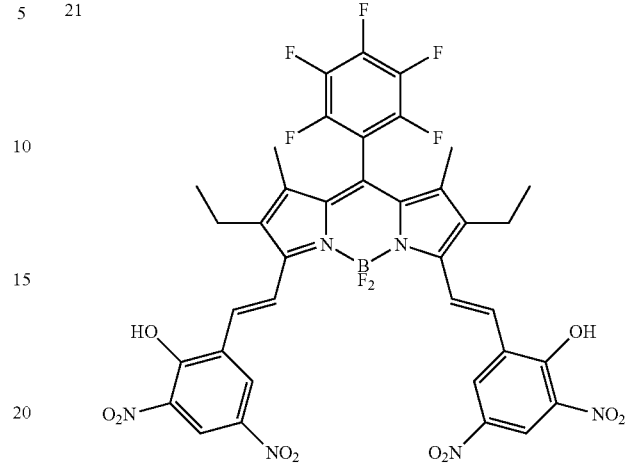 |
| 22 | 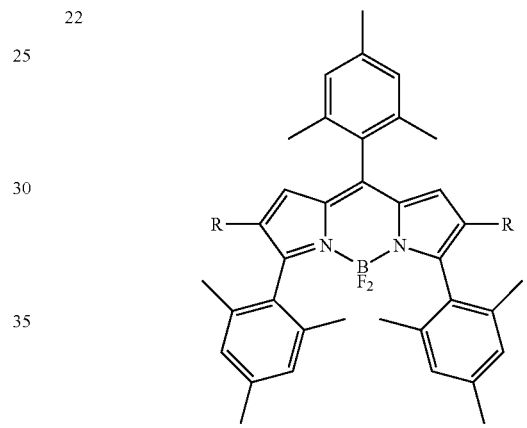
R = Me, Et, n-Pr |
| 23 | 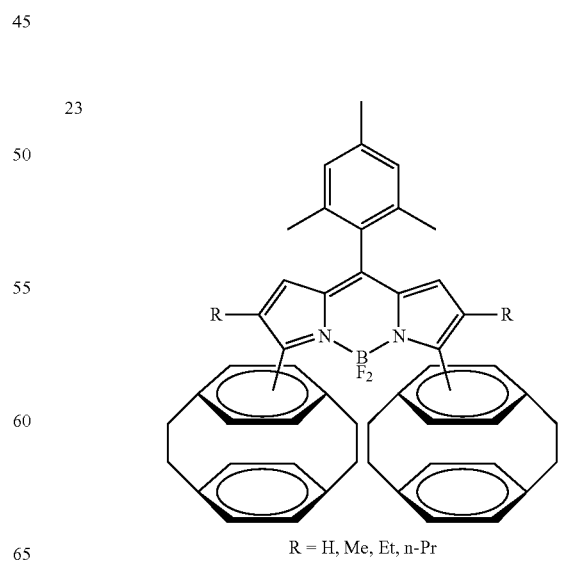
R = H, Me, Et, n-Pr |

TABLE 1-continued

| N° | Fluorescent dye |
|---|---|
| 24 | |
| 25 | |
| 26 | |
| 27 | |
| 28 | |
| 29 | |

TABLE 1-continued

| N° | Fluorescent dye |
|---|---|
| 30 | (structure) |
| 31 | (structure) |
| 32 | (structure) |
| 33 | (structure) OH in position o, m or p |
| 34 | (structure) |
| 35 | (structure) |
| 36 | (structure) |
| 37 | (structure) |
| 38 | (structure) |

TABLE 1-continued

| N° | Fluorescent dye |
|---|---|
| 39 | (structure: BODIPY derivative with cyclohexyl substituent, methyl, ethyl groups, and BF₂ core) |

For the description of the compounds implemented in this invention, the terms and expressions used must, unless mentioned otherwise, be interpreted according to the definitions hereinafter.

The term "halogen" designates fluoro, chlora, bromo or ioda. Preferred halogen groups are fluoro and bromo, fluora being particularly preferred.

The term "alkyl" designates a hydrocarbon radical of formula CnH2n+1, linear or branched, wherein n is an integer greater than or equal to 1. The preferred alkyl groups are the C1 to C6 alkyl groups, linear or branched.

The term "alkenyl" designates an unsaturated alkyl group, linear or branched, comprising one or several carbon-carbon double bonds. Suitable alkenyl groups include from 2 to 6 carbon atoms, preferably from 2 to 4 carbon atoms and even more preferably 2 or 3 carbon atoms. Non-limiting examples of alkenyl groups are ethenyl (vinyl), 2-propenyl (allyl), 2-butenyl and 3-butenyl, ethenyl and 2-propenyl being preferred.

The term "cycloalkyl", alone or as part of another group, designates a saturated mono-, di- or tri-cyclic hydrocarbon radical having 3 to 12 carbon atoms, in particular 5 to 10 carbon atoms, more particularly 6 to 10 carbon atoms. Suitable cycloalkyl radicals include, without being limited thereto, cyclopentyl, cyclohexyl, norbornyl, adamantyl, in particular cyclohexyl and adamantyl. Preferred cycloalkyl groups include cyclohexyl, adamant-1-yl and adamant-2-yl.

The term "aryl" designates a polyunsaturated, aromatic, monocyclic (for example phenyl) or polycyclic (for example naphthyl, anthracene, phenantryl, pyrenyl) hydrocarbon radical. Preferred aryl groups include phenyl, naphthyl, anthracenephenantryl, pyrenyl.

The term "heteroaryl" designates an aromatic ring having from 5 to 12 carbon atoms wherein at least one carbon atom is replaced with an oxygen, nitrogen or sulphur atom or with —NH, said nitrogen and sulphur atoms can optionally be oxidised and said nitrogen atom can optionally be quaternised, or a cyclic system containing 2 to 3 fused rings each containing typically 5 or 6 atoms and of which at least one ring is aromatic, at least one carbon atom of the at least one aromatic ring being replaced with an oxygen, nitrogen or sulphur atom or with —NH, said nitrogen and sulphur atoms can optionally be oxidised and said nitrogen atom can optionally be quaternised. Examples of heteroaryl groups include furanyl, thiophenyl, pyrrolyl, pyridinyl and benzofuranyl.

The compounds implemented in this invention can be synthesised according to methods known to those skilled in the art. Reference can be made in particular to the publication of A. Loudet et al. (Chem. Rev. 2007, 107, 4891-4932).

Another object of this invention is as such a securing element such as described hereinabove.

This invention also has for object a method for securing a product, in particular a document, that implements a securing element such as defined hereinabove.

The method of securing comprises:
preparing a securing element such as defined hereinabove, said securing element able to form the product and in particular the document as such, or
be applied to said product and in particular to said document to be secured.

In the case where the securing element does not form the product as such, the application on the product to be secured is implemented by techniques known to those skilled in the art according to said product and in particular said document to be secured.

By way of example, if the product to be secured is a document and in particular an identity document, the application of the securing element can be carried out by laminating on at least one portion of one of the surfaces of the document.

In a particular embodiment, the product to be secured is a document such as for example an identity, fiduciary or administrative document and the securing element can as such be applied to at least one portion of a surface of the product.

In an alternative of this embodiment, the securing element is a film which is laminated on the two surfaces of a document. The laminating can be carried out hot or cold. In another alternative, the film is applied only to one of the two surfaces of a document. In yet another alternative, the film is applied to only a portion of one of the two surfaces of a document. In yet another alternative, the film is applied to only one portion of each one of the two surfaces of a document.

According to another embodiment, the securing element is a film which is laminated on at least one face comprising a reflective surface. A reflective surface is a surface of which the capacities for reflection are controlled. For example, the reflective surface can be a metallised surface. As such the securing element can be a set of several layers of which at least one of them comprises a metallised surface whereon a polymer film is laminated that incorporates the compounds of the 4-bora-3a,4a-diaza-s-indacene family such as hereinabove.

In a particular embodiment, the securing element is a laminated layer on either side by at least one layer of polymer that does not contain any fluorescent dye, as such the securing element forms the card core.

According to a particular embodiment, the securing element is a varnish and can as such be applied to the surface of a product to be secured. The surface whereon the varnish is applied can in particular be a reflective surface. According to this embodiment, said application can be carried out by varnishing and/or coating and makes it possible in particular to obtain a layer or a film that advantageously has a thickness ranging from 1 μm to 40 μm. In terms of this invention, a varnish is a non-pigmented composition, that can be comprised of binders, solvents and optionally diluent and/or additives.

In a particular embodiment, the securing element is an ink, in particular an ink for offset printing, comprising in its formulation a polymer wherein a fluorescent compound is integrated, said polymer being in particular a resin and particularly a rosin resin or a pine resin. In terms of this invention, an ink is a pigmented composition that can be used for writing, drawing or printing.

This ink can be used for the securing of the product and in particular a document, by application on said product or said document. Advantageously, using an ink for securing according to this invention makes it possible to obtain layers with a thickness ranging from 1 μm to 40 μm. The application can be carried out on the surface of said product or of said document to be secured or on an element that forms the latter. The constituent element can for example be a reflective surface, said surface able to be metallised or not, a polyester or polypropylene film, said film being comprised partially or entirely of a transparent and/or reflective region.

The application can be carried out according to techniques known to those skilled in the art, such as in particular offset printing or screen printing, techniques which will be chosen according to the product or the support of the document to be secured.

When they are used in offset printing, the inks secured according to this embodiment have the advantage of limiting the obstruction of the print heads because the fluorescent components are less occlusive than pigments or dye that are conventionally used.

In another particular embodiment, the securing element is an adhesive comprising a polymer wherein a fluorescent compound is integrated. This adhesive can be used for the securing of the product and in particular a document by apposition on said product or document to be secured. By way of example, the adhesives secured as such can be used to manufacture packaging.

The products to be secured can be of any nature. This can be for example packaging, such as blisters or plastic, documents such as identity, fiduciary or administrative documents such as registration certificates.

The invention shall be understood better using figures and examples that follow, which are intended for the purposes of illustration and are in no way limiting.

EXAMPLES

Example 1: Preparation of a Transparent Layer of a Securing Element with a Polycarbonate Polymer Base Incorporating a Fluorescent Dye For this example of a securing element, the polymer chosen is polycarbonate sold under the reference Makrolon® 2658 by Bayer.

The fluorescent dye chosen is 2,8-diethyl-5,5-difluoro-10-mesityl-3, 7-di(thiophen-2-yl)-5H-dipyrrolo[1,2-c:2',1'-f][1,3,2]diazaborinin-4-ium-5-uide of formula:

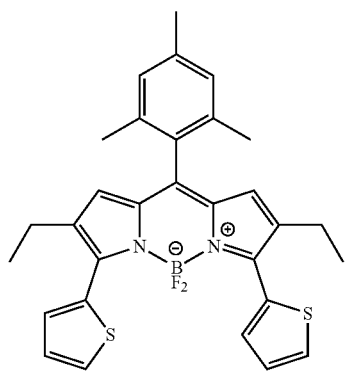

This fluorescent dye absorbs at 590 nm and has a fluorescence emission at 641 nm.

In order to determine the quantities of fluorescent dyes to be incorporated so as to obtain a transparent layer, the following four test compositions were prepared:

Composition 1: polycarbonate Makrolon® 2658 mixed with 1% fluorescent dye.
Composition 2: polycarbonate Makrolon® 2658 mixed with 0.05% fluorescent dye.
Composition 3: polycarbonate Makrolon® 2658 mixed with 0.0167% fluorescent dye.
Composition 4: polycarbonate Makrolon® 2658 mixed with 0.005% fluorescent dye.

The percentages are expressed by weight in relation to the total weight of the fluorescent dye.

The four compositions were then extruded using a PLASTI-CORDER® extruder sold by BRADENDER and which has the characteristics hereinafter Diameter of the screw: 25 mm
Length of the screw: 40 D
Speed range: 0-150 rpm
Maximum torque: 2×90 Nm
Two filling sections
A degassing section
Temperature range for extrusion: 260° C.-290° C.
Extrusion pressure: ambient pressure The extruder makes it possible to obtain granules or beads which will undergo a step of thermocompression in order to obtain the layers of securing element. The granules or beads were therefore thermocompressed in moulds.

The equipment used for this step is a LESCUYER press of which the plates of the press were heated to 290° C. and the compression was carried out at 50 bars for 2 to 3 min.

After cooling, layers of securing element of 10 cm×10 cm are obtained and have a thickness of about 0.400 mm.

Pour each composition, a layer was prepared according to the description hereinabove.

For each layer, the absorption and fluorescence spectra were recorded.

Figure 1:
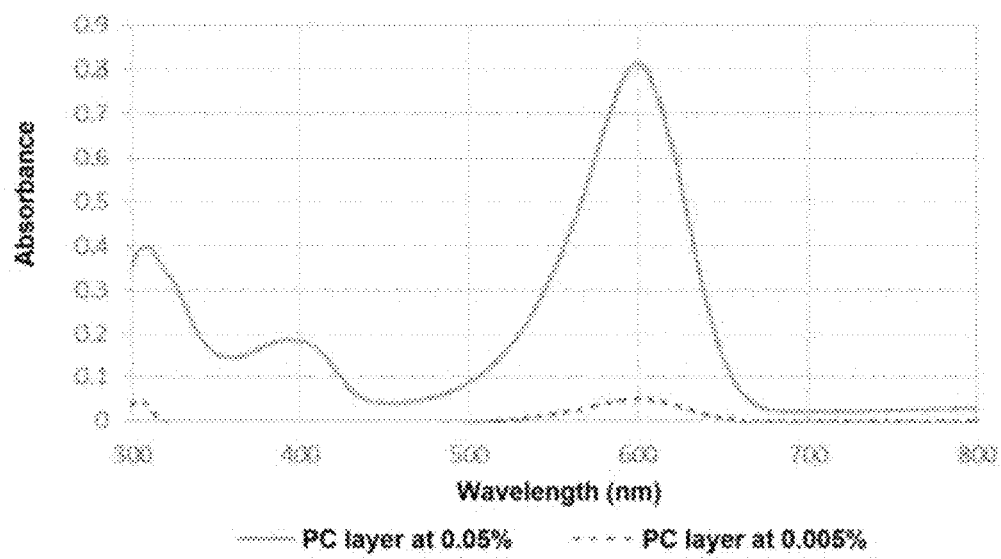
FIG. 1 shows the absorption spectrum of the layers of polycarbonate with a thickness of about 0.400 mm incorporating respectively 0.05% and 0.005% by weight of fluorescent dye.

FIG. 1 shows the absorption spectra of the layers of polycarbonate incorporating 0.05% and 0.005% by weight of fluorescent dye, respectively. A bathochromic displacement (shift) is observed of $\lambda_{max}$ in relation to the absorption spectrum of the fluorescent dye in solution which has a $\lambda_{max}$ of 588 nm. For this layer made of polycarbonate, the $\lambda_{max}$ of absorption measured are indeed 600 nm (0.05% of fluorescent dye) and 599 nm (0.005% of fluorescent dye). The maximum absorbances ($abs_{max}$) and the concentration in fluorescent dye were also determined. The latter was determined by using the value ε in solution (45000 mol·L$^{-1}$·cm$^{-1}$). The results are summarised in table 2 hereinafter.

TABLE 2

| Sample | 0.05% fluorescent dye | 0.005% fluorescent dye |
|---|---|---|
| $\lambda_{max}$ (nm) | 600 | 599 |
| $abs_{max}$ | 0.81 | 0.05 |
| Concentration (mol · L$^{-1}$ · cm$^{-1}$) | 4.51E−05 | 2.84E−06 |

Figure 2:
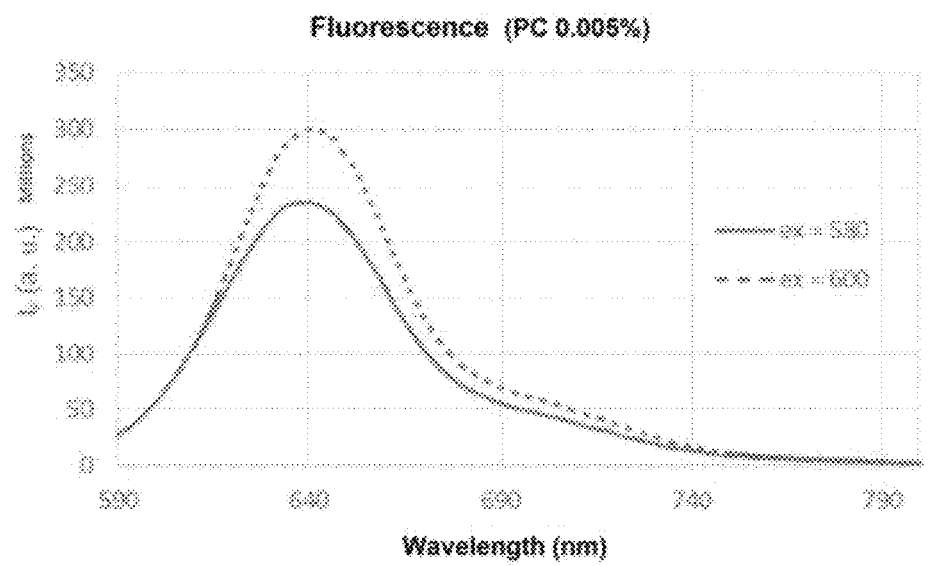
FIG. 2 shows the fluorescence spectrum of a layer of polycarbonate with a thickness of about 0.400 mm incorporating 0.005% by weight of fluorescent dye.

FIG. 2 shows the fluorescence spectra of the layer of polycarbonate containing 0.005% fluorescent dye with an excitation wavelength of 580 nm and 600 nm respectively. A slight hypsochromic displacement (shift) of $\lambda_{max}$ is observed in relation to the fluorescence spectrum of the fluorescent dye in solution which has a $\lambda_{max}$ of 644 nm. For this layer made of polycarbonate, the $\lambda_{max}$ measured are indeed 641 nm for an excitation wavelength of 600 nm and 640 nm for an excitation wavelength of 580 nm.

Figure 3:
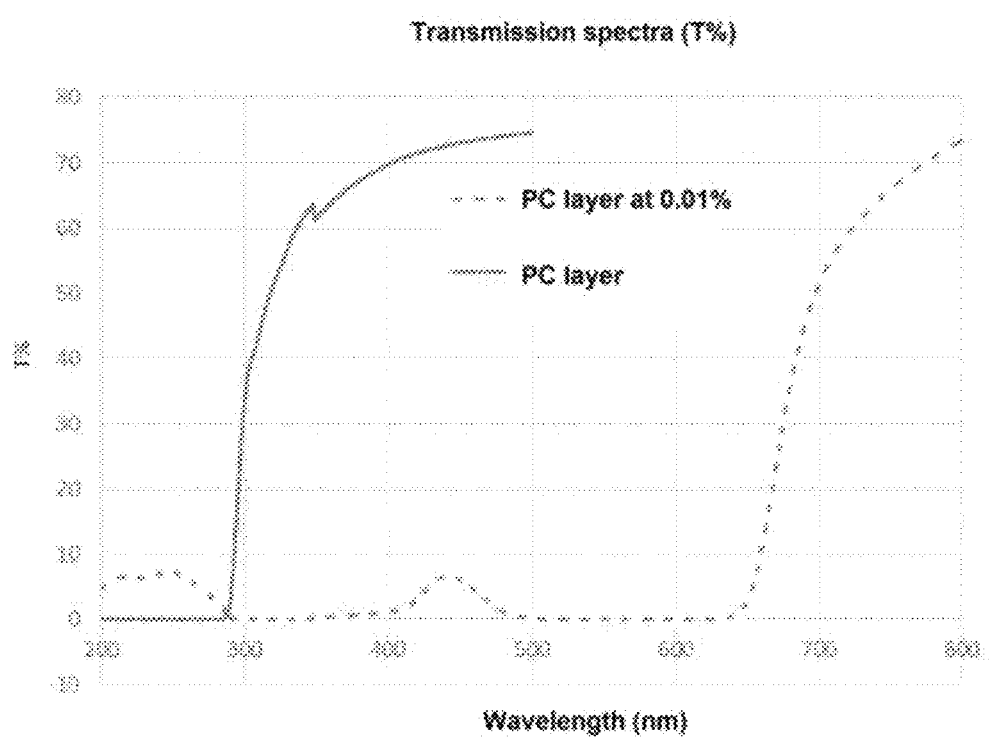
FIG. 3 shows the transmission spectrum of a layer of polycarbonate with a thickness of about 0.400 mm incorporating 0.1% by weight of fluorescent dye.

With regards to the transmission of light, the layer obtained using composition 1, with a concentration in fluorescent dye of 0.1% by weight with respect to the total weight of the polymer does not transmit below 650 nm (cf. FIG. 3).

Composition 3 makes it possible to obtain a layer of transparent fluorescent securing element that allows light to pass which as such makes it possible to change the colour according to the incident light beams.

Other tests were conducted by varying the fluorescent dyes used but while retaining the same concentrations. Films having absorbance wavelengths ranging from 516 nm to 727 nm and fluorescence wavelengths ranging from 527 nm to 742 nm were as such obtained.

Example 2: Preparation of a Transparent Layer of a Securing Element with a Base of Polyurethane Thermoplastic Polymer Incorporating a Fluorescent Dye For this example, the polymer chosen is the thermoplastic polyurethane sold under the reference Desmopan® DP 9386A by Bayer.

The fluorescent dye chosen is 2,8-diethyl-5,5-difluoro-1,3,7,9-tetramethyl-10-(perfluorophenyl)-5H-dipyrrolo[1,2-c:2',1'-f][1,3,2]diazaborinin-4-ium-5-uide of the formula hereinbelow (O.V.M 6):

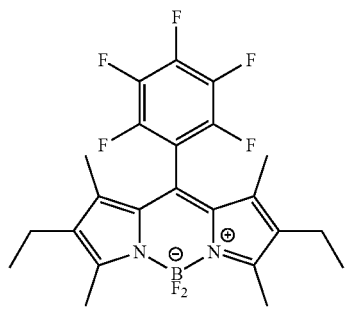

The dye chosen absorbs at 544 nm and has a fluorescence emission at 558 nm.

In order to obtain a transparent fluorescent layer, three test compositions were as such prepared:

Composition 1: thermoplastic polyurethane Desmopan® DP 9386A mixed with 0.05% fluorescent dye.

Composition 2: thermoplastic polyurethane Desmopan® DP 9386A mixed with 0.0167% fluorescent dye.

Composition 3: thermoplastic polyurethane Desmopan® DP 9386A mixed with 0.005% fluorescent dye.

The percentages are expressed by weight in relation to the total weight of the fluorescent dye.

For each composition, a layer was prepared according to an operating procedure identical to the one of example 1.

The three compositions prepared with a base of polyurethane thermoplastic polymer make it possible to obtain layers of securing element that have the same appearance and the same transparency as those obtained with the compositions prepared with the polycarbonate polymer base.

The spectrophotometric analyses of the various layers of securing element obtained show that the incorporation of the fluorescent dye into the thermoplastic polyurethane does not alter its performance in terms of absorption and emission of fluorescence.

The possibilities of incorporating fluorescent dyes of this invention are as such demonstrated.

The invention claimed is:

1. Securing element of a product, said securing element comprising a polymer and one or more compounds of the 4-bora-3a,4a-diaza-s-indacene family, said compound being incorporated in said polymer and is chosen from those of formula I:

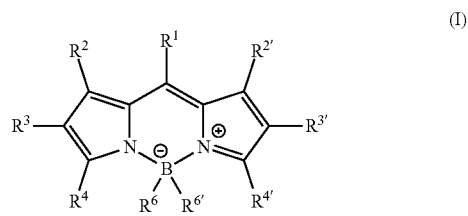

wherein, $R^1$ is a phenyl substituted by one or several groups chosen from methyl, fluoro, hydroxy, acetyl and methacrylate;

$R^2$ and $R^{2'}$ are independently chosen from hydrogen and C1 to C2 alkyl;

$R^3$ and $R^{3'}$ are independently chosen from hydrogen, aryl, heteroaryl, cycloalkyl, alkyl, alkenyl, alkynyl, said aryl, heteroaryl, cycloalkyl, alkyl, alkenyl and alkynyl being unsubstituted or substituted by one or several groups chosen from C1 to C4 alkyl, aryl, hydroxy and ferrocene, said aryl group being unsubstituted or substituted by one or several groups chosen from aryl, C1 to C2 alkyl, halogen, hydroxy, dimethylamino, nitro, said aryl being unsubstituted or substituted by a C1 to C2 alkyl group;

$R^4$ and $R^{4'}$ are independently chosen from aryl, heteroaryl, cycloalkyl, alkyl, alkenyl, said aryl, heteroaryl, cycloalkyl, alkyl and alkenyl being unsubstituted or substituted by one or several groups chosen from C1 to C3 alkyl, aryl, hydroxy and ferrocene, said aryl group being unsubstituted or substituted by one or several groups chosen from aryl, C1 to C2 alkyl, halogen, hydroxy, dimethylamino, nitro, said aryl being unsubstituted or substituted by a C1 to C2 alkyl group;

$R^5$ is C1 to C4 alkyl or C1 to C4 alkenyl;

$R^6$ and $R^{6'}$ are independently chosen from halogens, C1 to C4 alkyl, C2 to C4 alkenyl or aryl, said aryl being unsubstituted or substituted by one or several groups chosen from 01 to C2 alkyl, hydroxy, R5COO— and halogen.

2. The securing element according to claim 1, wherein the compound of the 4-bora-3a,4a-diaza-s-indacene family are chosen from:

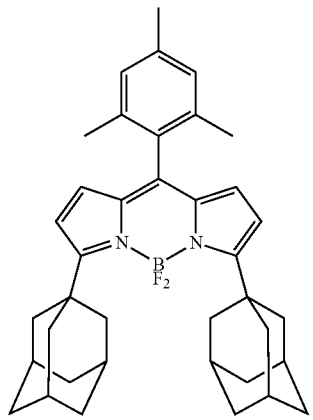

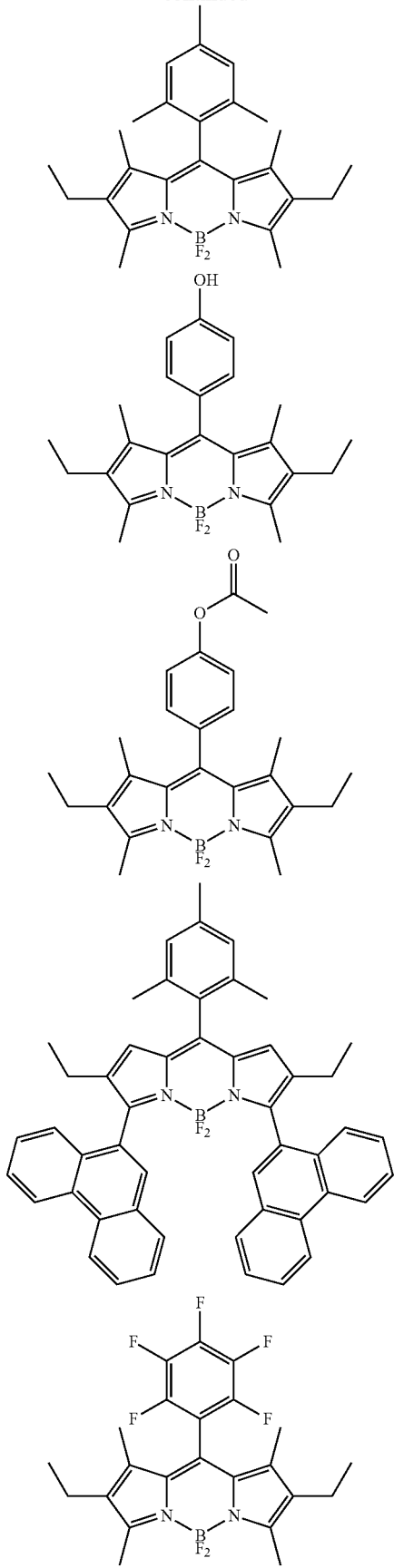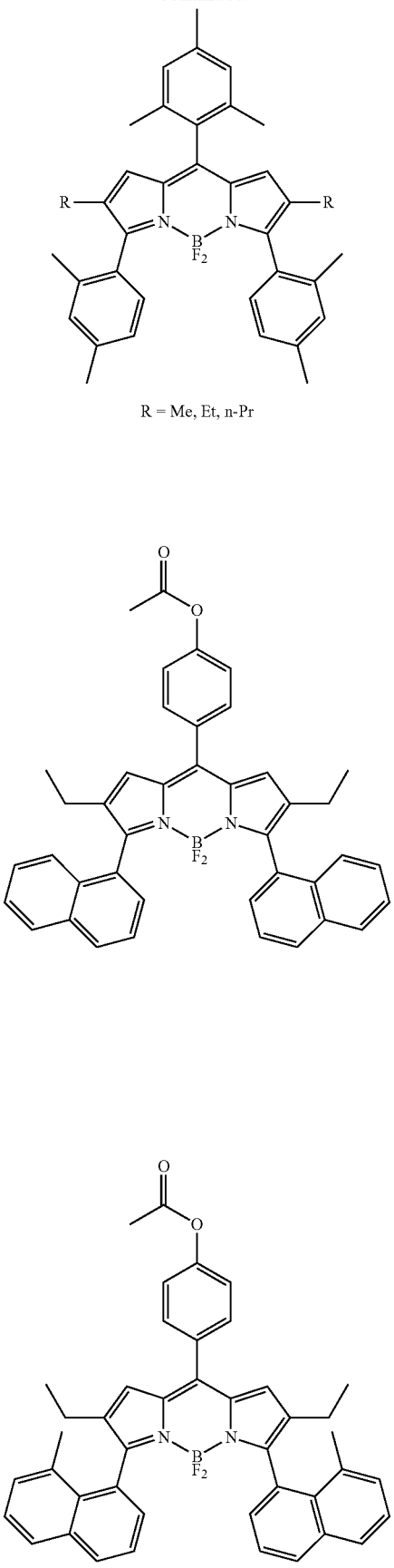
R = Me, Et, n-Pr

-continued
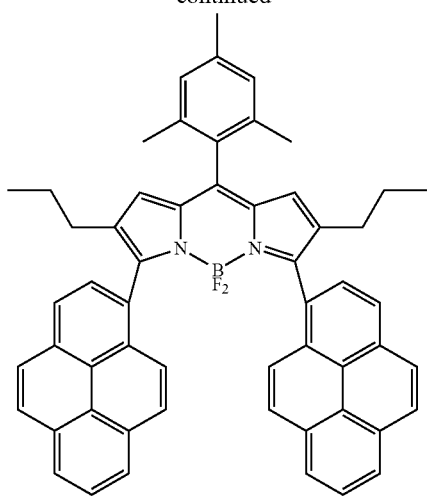
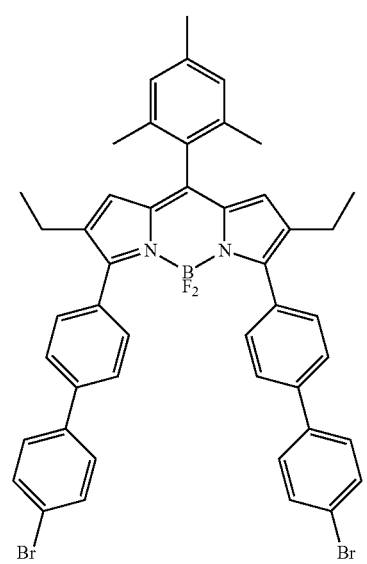
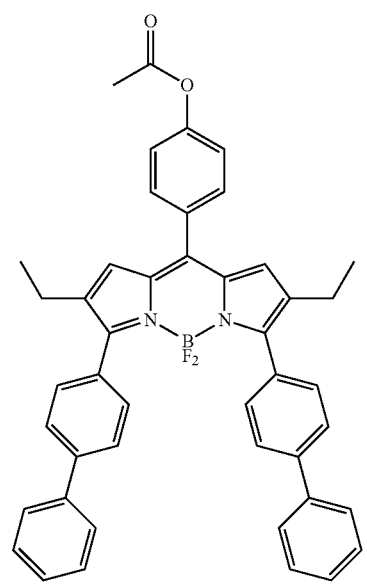
-continued
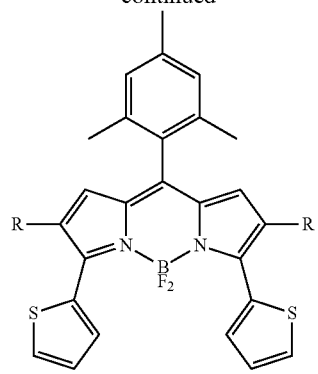
R = n-Pr
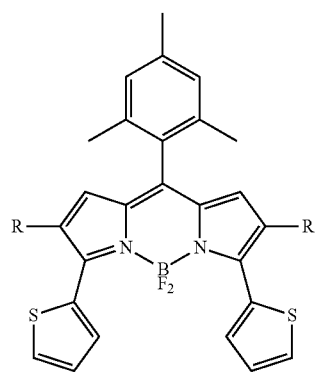
R = Et
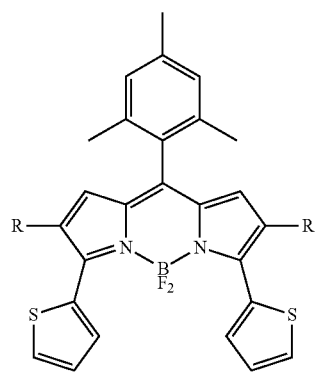
R = Me
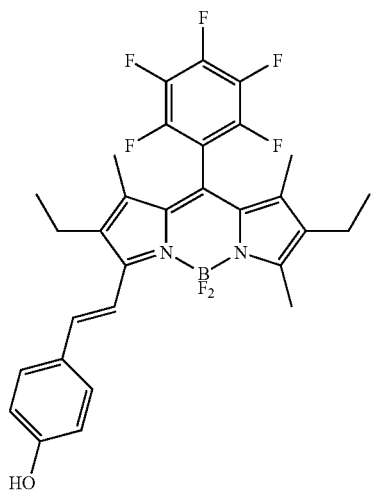

31
-continued
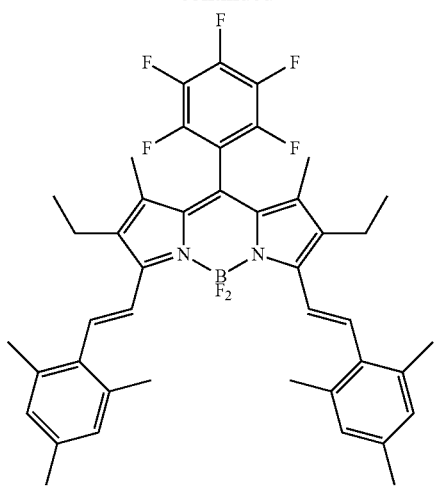
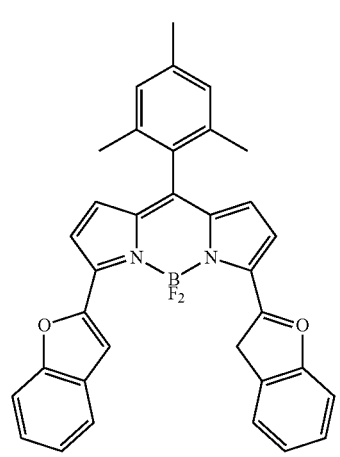
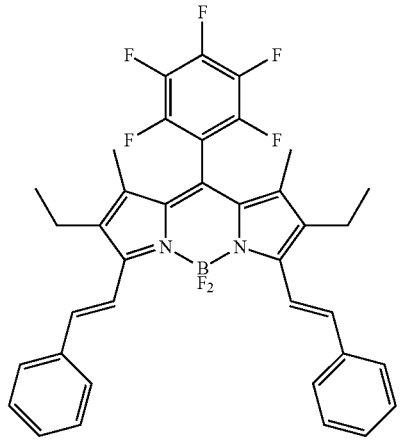
32
-continued
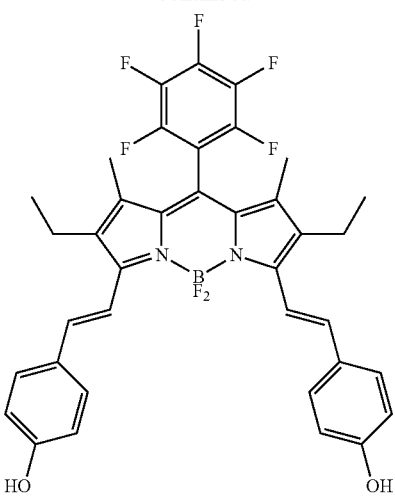
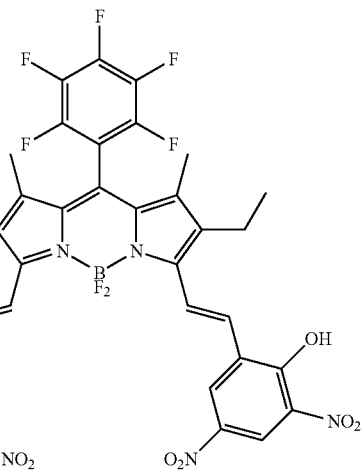
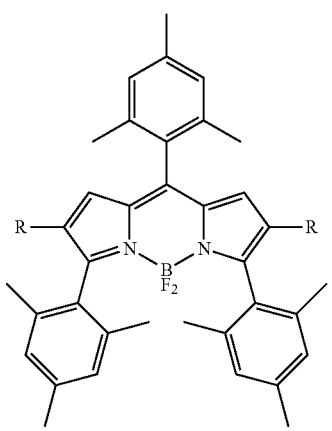
R = Me, Et, n-Pr 33
-continued
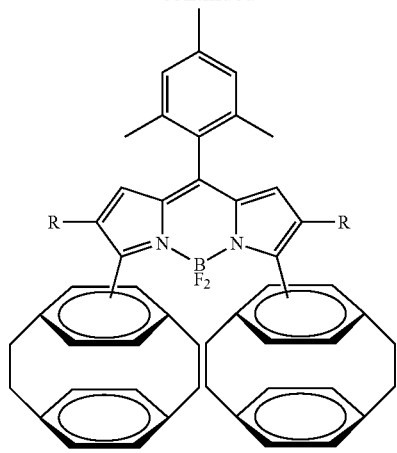
34
-continued
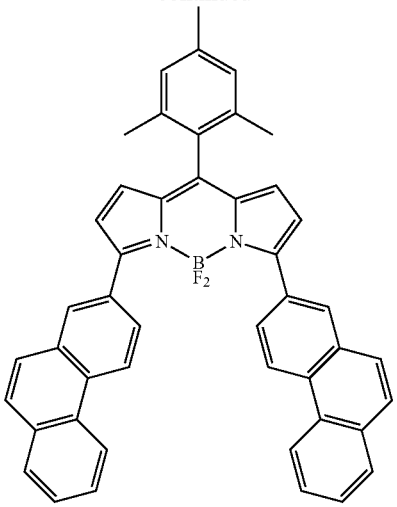
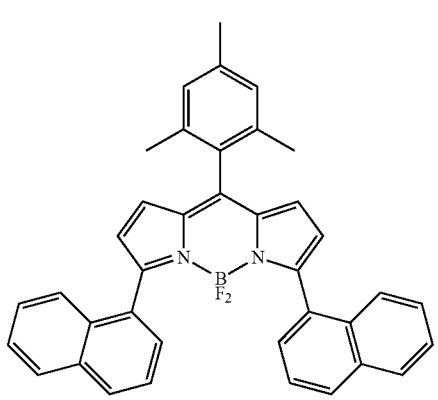
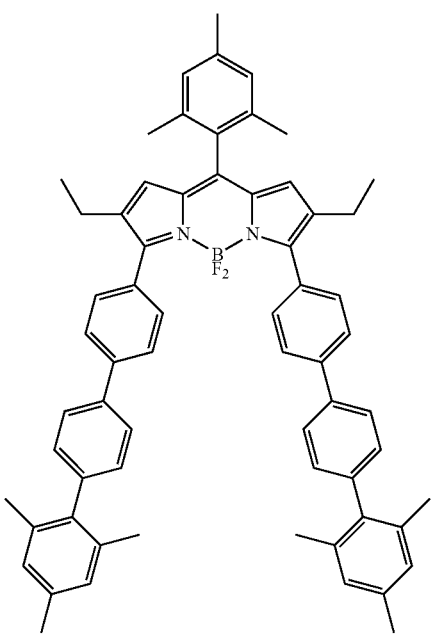
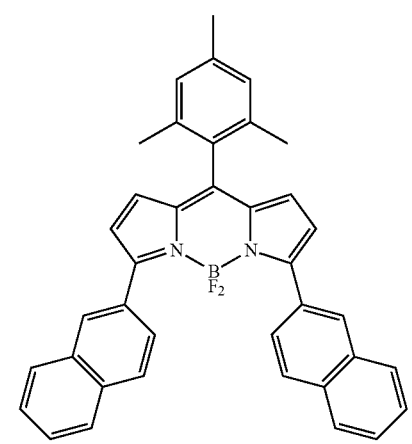
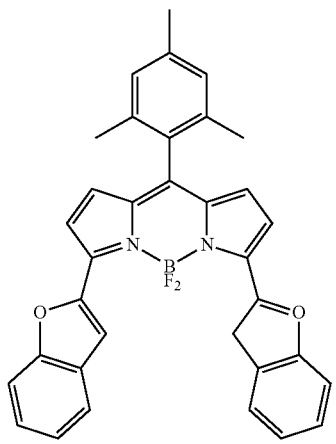

-continued

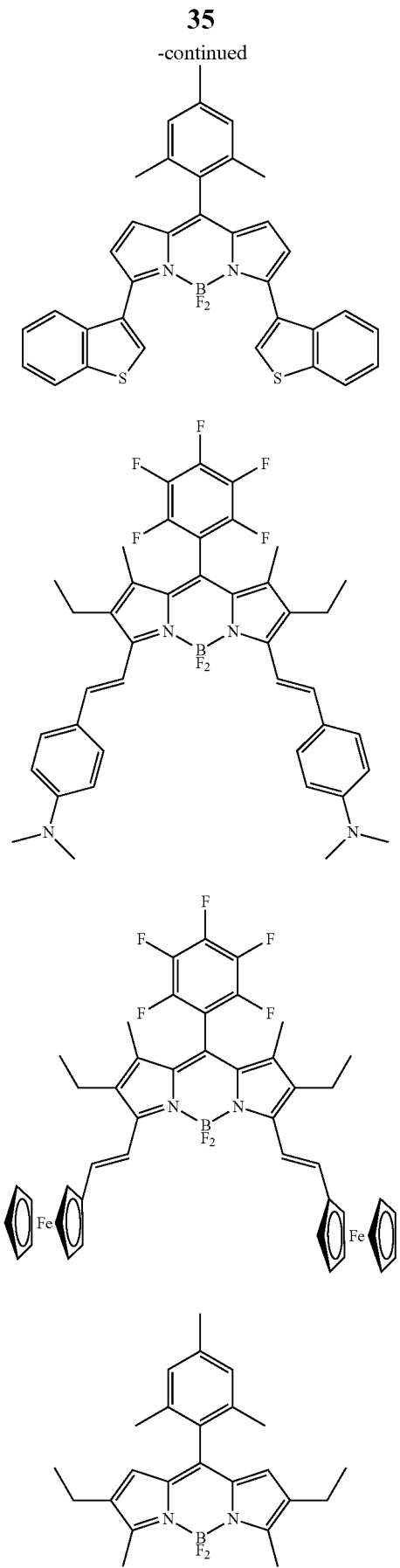

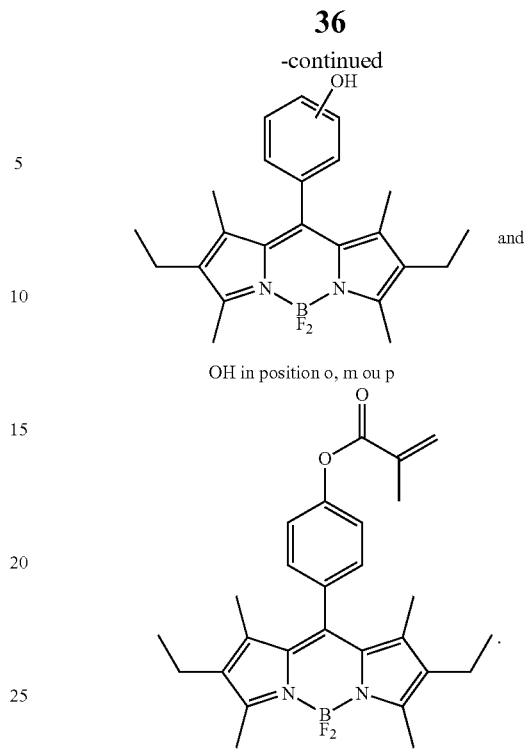

3. The securing element according to claim 1, wherein the polymer is chosen from polycarbonate, polyester, polystyrene, polyethylene, polypropylene, polyethylene terephthalate, polyacrylate, polymethacrylate, poly(vinyl chloride), polyamides, polyaramides, ethylene vinyl acetate (EVA), polyurethane, thermoplastic polyurethane (TPU), cyanoacrilate, rosin resins, pine resins, light-curing resins or mixtures thereof.

4. The securing element according to claim 1, wherein the polymer is chosen from polycarbonate, polyester, polypropylene, thermoplastic polyurethane and light-curing resins.

5. The securing element according to claim 1, wherein the polymer is polycarbonate, polyester, polypropylene or mixtures thereof.

6. The securing element according to claim 1, wherein it has the form of a layer.

7. The securing element according to claim 6, wherein the layer has a thickness ranging from 0.050 mm to 0.800 mm.

8. The securing element according to claim 6, wherein the layer is a film.

9. The securing element according to claim 6, wherein the polymer is polycarbonate and the layer has a thickness ranging from 100 µm to 800 µm.

10. The securing element according to claim 6, wherein the polymer is polypropylene and the layer has a thickness ranging from 15 µm to 100 µm.

11. The securing element according to claim 1, wherein the securing element is an ink or varnish.

12. The securing element according to claim 1, wherein the securing element is an adhesive.

13. Method for securing a product comprising the step of:
preparing a securing element comprising a polymer and one or more compounds of the 4-bora-3a,4a-diaza-s-indacene family, said compound being incorporated in said polymer and is chosen from those of formula I:

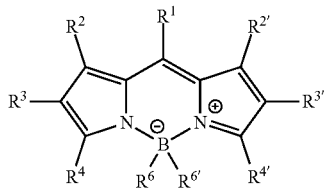

(I)

wherein, $R^1$ is a phenyl substituted by one or several groups chosen from methyl, fluoro, hydroxy, acetyl and methacrylate;

$R^2$ and $R^{2'}$ are independently chosen from hydrogen and C1 to C2 alkyl;

$R^3$ and $R^{3'}$ are independently chosen from hydrogen, aryl, heteroaryl, cycloalkyl, alkyl, alkenyl, alkynyl, said aryl, heteroaryl, cycloalkyl, alkyl, alkenyl and alkynyl being unsubstituted or substituted by one or several groups chosen from C1 to C4 alkyl, aryl, hydroxy and ferrocene, said aryl group being unsubstituted or substituted by one or several groups chosen from aryl, C1 to C2 alkyl, halogen, hydroxy, dimethylamino, nitro, said aryl being unsubstituted or substituted by a C1 to C2 alkyl group;

$R^4$ and $R^{4'}$ are independently chosen from aryl, heteroaryl, cycloalkyl, alkyl, alkenyl, said aryl, heteroaryl, cycloalkyl, alkyl and alkenyl being unsubstituted or substituted by one or several groups chosen from C1 to C3 alkyl, aryl, hydroxy and ferrocene, said aryl group being unsubstituted or substituted by one or several groups chosen from aryl, C1 to C2 alkyl, halogen, hydroxy, dimethylamino, nitro, said aryl being unsubstituted or substituted by a C1 to C2 alkyl group;

$R^5$ is C1 to C4 alkyl or C1 to C4 alkenyl;

$R^6$ and $R^{6'}$ are independently chosen from halogens, C1 to C4 alkyl, C2 to C4 alkenyl or aryl, said aryl being unsubstituted or substituted by one or several groups chosen from C1 to C2 alkyl, hydroxy, R5COO— and halogen;

applying said prepared securing element to the product to be secured.

14. The method for securing according to claim 13, wherein the application of said securing element is carried out over at least one portion of said product to be secured.

15. The method for securing according to claim 13, wherein the product to be secured is an identity, fiduciary or administrative document.

16. The method for securing according to claim 13, wherein the polymer is chosen from polycarbonate, polyester, polystyrene, polyethylene, polypropylene, polyethylene terephthalate, polyacrylate, polymethacrylate, poly(vinyl chloride), polyamides, polyaramides, ethylene vinyl acetate (EVA), polyurethane, thermoplastic polyurethane (TPU), cyanoacrilate, rosin resins, pine resins, light-curing resins and mixtures thereof.

\* \* \* \* \*